(12) United States Patent
Morga et al.

(10) Patent No.: US 9,469,171 B2
(45) Date of Patent: Oct. 18, 2016

(54) LEVELOADER

(71) Applicants: Brian Morga, Paw Paw, MI (US);
Devon Jackson, Kalamazoo, MI (US);
Jim Bower, Kalamazoo, MI (US)

(72) Inventors: Brian Morga, Paw Paw, MI (US);
Devon Jackson, Kalamazoo, MI (US);
Jim Bower, Kalamazoo, MI (US)

(*) Notice: Subject to any disclaimer, the term of this patent is extended or adjusted under 35 U.S.C. 154(b) by 21 days.

(21) Appl. No.: 14/538,974

(22) Filed: Nov. 12, 2014

(65) Prior Publication Data

US 2015/0137483 A1 May 21, 2015

Related U.S. Application Data

(60) Provisional application No. 61/906,581, filed on Nov. 20, 2013.

(51) Int. Cl.
| | |
|---|---|
| *B60D 1/06* | (2006.01) |
| *B60D 1/24* | (2006.01) |
| *B60D 1/46* | (2006.01) |
| *B60D 1/52* | (2006.01) |

(52) U.S. Cl.
CPC ............ *B60D 1/246* (2013.01); *B60D 1/06* (2013.01); *B60D 1/465* (2013.01); *B60D 1/52* (2013.01)

(58) Field of Classification Search
CPC ......... B60D 1/246; B60D 1/465; B60D 1/52
USPC ...................................................... 280/490.1
See application file for complete search history.

(56) References Cited

U.S. PATENT DOCUMENTS

| | | | |
|---|---|---|---|
| 2,612,384 A | 9/1952 | Wiegman | |
| 3,428,336 A | 2/1969 | Thurman | |
| 3,554,578 A * | 1/1971 | Reed | B60D 1/465 280/479.1 |
| 3,679,233 A | 7/1972 | Baker et al. | |
| 3,891,239 A | 6/1975 | Leo et al. | |
| 3,989,266 A | 11/1976 | Foster | |
| 4,042,254 A | 8/1977 | Allen | |
| 4,103,928 A * | 8/1978 | Sheppard, Jr. | B60D 1/46 280/490.1 |
| 4,148,499 A | 4/1979 | Johnson | |
| 4,277,080 A | 7/1981 | Smith et al. | |
| 4,343,484 A | 8/1982 | Van Antwerp | |
| 4,431,207 A | 2/1984 | Langenfeld et al. | |
| 4,509,768 A | 4/1985 | Haug | |
| 4,564,209 A | 1/1986 | Kingsley et al. | |
| 4,606,549 A | 8/1986 | Williams, Jr. | |
| 4,702,489 A | 10/1987 | Erickson | |
| 4,726,601 A | 2/1988 | Stevens | |
| 4,744,583 A | 5/1988 | Blackwood | |
| 5,236,214 A | 8/1993 | Taylor | |
| 5,401,047 A | 3/1995 | Dettlling, Jr. | |
| 5,435,586 A | 7/1995 | Smith | |
| 5,454,582 A | 10/1995 | Rines | |
| 5,580,076 A | 12/1996 | DeRoule et al. | |
| 6,030,170 A | 2/2000 | Lewis | |
| 6,155,588 A | 12/2000 | Maxey | |

(Continued)

*Primary Examiner* — Tony Winner
(74) *Attorney, Agent, or Firm* — The Dobrusin Law Firm, P.C.; Daniel P. Aleksynas

(57) ABSTRACT

A hitch device comprising: (a) a hitch bar that connects the hitch device to a vehicle; (b) a hitch mount in communication with the hitch bar; (c) a ball mount, a ball, or both that is in communication with and extends through a portion of the hitch mount; (d) a lifting device that is connected to the hitch mount, the hitch bar, or both, wherein the lifting device includes a lifting cylinder; and (e) one or more gears in communication with the lifting cylinder; wherein the lifting device assists in moving the ball mount, the ball, or both through the hitch mount; and wherein the lifting cylinder is an electric motor.

20 Claims, 5 Drawing Sheets

(56) References Cited

U.S. PATENT DOCUMENTS

| | | |
|---|---|---|
| 6,871,868 B2 | 3/2005 | Pogue |
| 6,945,553 B1 | 9/2005 | Gerres et al. |
| 7,059,419 B2 | 6/2006 | Greenwell |
| 7,264,260 B2 | 9/2007 | Overstreet |
| 7,497,458 B2 | 3/2009 | Daniel |
| 7,503,549 B2 | 3/2009 | Maturino |
| 7,566,067 B1 | 7/2009 | Alexander |
| 8,302,987 B2 | 11/2012 | Williams, Jr. et al. |
| 2003/0222426 A1* | 12/2003 | Rosenlund ............... B60D 1/06 280/490.1 |
| 2004/0084877 A1* | 5/2004 | Smith ...................... B60D 1/52 280/490.1 |
| 2005/0062257 A1 | 3/2005 | Donze |
| 2008/0048161 A1 | 2/2008 | Meyer |

* cited by examiner

LEVELOADER

FIELD

The present teachings relate to a hitch device that assists in leveling a trailer and more specifically a hitch that raises and lowers a ball so that a tongue of a trailer is moved up and down.

BACKGROUND

The present teachings are predicated upon providing an improved hitch device for connecting a tongue of a trailer to a vehicle. More specifically, the hitch device is used to level a trailer once the trailer is connected to a vehicle. Present trailers once connected to a vehicle may apply weight to the vehicle so that the vehicle suspension lowers and the trailer is no longer level, parts of the trailer drag on the ground, items on the trailer are more easily shifted, or a combination thereof. The user may attempt to level the trailer by removing the trailer from the hitch extending the ball and reattaching. However, many hitches to not have the capability of height adjustability and the ones that do are very manually intensive and it may take multiple attempts of unconnected and reconnecting to adequately level a trailer. Attempts have been made to create a device that moves a tongue of a trailer however many of these devices are very large and cumbersome and are not easily installed and removed by a single user. Furthermore, these device may include an additionally power supply or source of power that is not readily available with a vehicle.

Examples of some hitches are disclosed in U.S. Pat. Nos. 4,148,499; 4,564,209; 5,454,582; 6,155,588; 7,264,260; 7,497,458; and 7,566,067 and U.S. Patent Application Publication No. 2005/0062257 all of which are expressly incorporated herein by reference for all purposes. It would be attractive to have a compact hitch device that is light weight so that a single person can install. What is needed is a compact hitch device that can lift over 2000 pounds. What is needed is a hitch device that levels a trailer while the trailer is connected to the hitch device, a vehicle, or both.

SUMMARY

The present teachings include: a hitch device comprising: (a) a hitch bar that connects the hitch device to a vehicle; (b) a lifting device; (c) a hitch mount in communication with the hitch bar; and (d) a platform that is in communication with the lifting device and hitch mount; wherein the lifting device moves a portion of the hitch mount while the lifting device and hitch bar remain static.

The present teachings provide: a hitch device comprising: (a) a hitch bar that connects the hitch device to a vehicle; (b) a hitch mount in communication with the hitch bar; (c) a ball mount, a ball, or both that is in communication with and extends through a portion of the hitch mount; (d) a lifting device that is connected to the hitch mount, the hitch bar, or both, wherein the lifting device includes a lifting cylinder; and (e) one or more gears in communication with the lifting cylinder; wherein the lifting device assists in moving the ball mount, the ball, or both through the hitch mount; and wherein the lifting cylinder is an electric motor.

The present teachings provide: a hitch device comprising: (a) a hitch mount including: (i) a hitch bar extending from the hitch mount, the hitch bar being configured to connect the hitch device to a vehicle; (ii) a ball mount at least partially extending into the hitch bar, wherein the ball mount is movable relative to the hitch mount and the hitch bar; (iii) a ball connected to the ball mount, and being movable with the ball mount; (iv) a plurality of locking devices longitudinally located along the ball mount; and (v) one or more apertures located in the hitch mount so that the ball mount upon movement to a desired location can be locked relative to the hitch mount by extending one or more fasteners through one or more of the plurality of locking devices and one or more of the one or more apertures; and (b) a lifting device including: (i) a lifting cylinder; (ii) a platform connecting the lifting cylinder to the hitch mount; (iii) a shaft extending from the platform; (iv) one or more gears connected to an end of the shaft opposite the platform; (v) a drive rod including one or more gears that are in communication with the one or more gears connected to the shaft so that power form the lifting cylinder is transferred from the shaft to the drive rod so that the ball mount is moved along its axis; and wherein the drive rod is longitudinally extendable by the lifting cylinder so that the drive rod moves the ball mount along a longitudinal axis raising or lowering the ball so that when a trailer is connected to the ball a tongue of the trailer can be raised and lowered so that the trailer can be dumped, leveled, or both; and wherein the lifting cylinder is an electric motor.

The present teachings include: a hitch device comprising: (a) a hitch mount including: (i) a hitch bar extending from the hitch mount, the hitch bar being configured to connect the hitch device to a vehicle; (ii) a ball mount at least partially extending into the hitch bar, wherein the ball mount is movable relative to the hitch mount and the hitch bar; (iii) a ball connected to the ball mount, and the ball being movable with the ball mount; (iv) a plurality of locking devices longitudinally located along the ball mount; and (v) one or more apertures located in the hitch mount so that the ball mount upon movement of the ball mount to a desired location the ball mount can be located relative to the hitch mount by extending one or more fasteners through one or more of the plurality of locking devices an one or more of the one or more apertures; and (b) a lifting device including: (i) a lifting cylinder; (ii) a platform connected to both the lifting cylinder and the ball mount; (iii) a drive rod at least partially extending from the platform through a drive rod slot; and wherein the drive rod is longitudinally extendable by the lifting cylinder so that the drive rod moves the ball mount along a longitudinal axis raising or lowering the ball so that when a trailer is connected to the ball a tongue of the trailer can be raised and lowered so that the trailer can be dumped, leveled, or both.

The present teachings provide a compact hitch device that is light weight so that a single person can install. The present teachings provide a compact hitch device that can lift over 2000 pounds. The present teachings provide a hitch device that levels a trailer while the trailer is connected to the hitch device, a vehicle, or both.

DETAILED DESCRIPTION

Figure 1:
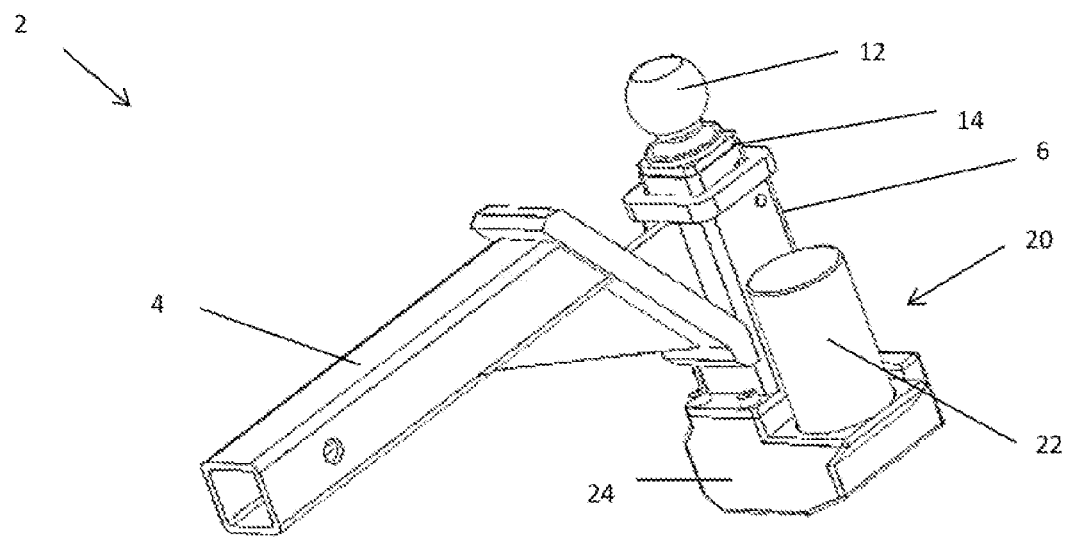
FIG. 1 illustrates a perspective view of the hitch device.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide an improved compact hitch device that connects to a vehicle. The vehicle may be any vehicle that functions to move a trailer or some other apparatus that connects to a vehicle. The vehicle may be any passenger vehicle, any vehicle with a hitch, or both. The vehicle may be a four wheeler, a tractor, a truck, a semi-truck, an off road vehicle, a side by side all-terrain vehicle, a sports utility vehicle (SUV), a car, or a combination thereof. The vehicle may be any vehicle with a hitch and a towing capacity sufficient to pull a trailer connected to a hitch device.

The hitch device may function to connect a trailer to a vehicle, raise and lower a tongue of a trailer, raise and lower a utility basket connected to the hitch device, or a combination thereof. The hitch device may be used as a jack. The hitch device may be disconnected from a vehicle and be used to lift the vehicle, the tongue of the trailer, a part of the trailer, or a combination thereof. The hitch device may be disconnected and used to change a tire. The hitch device may function to extend from a rear of a vehicle and create a point of connection for other devices. The hitch device may weigh about 40 Kg or less, preferably about 25 Kg or less, more preferably about 18 Kg or less, even more preferably about 12 Kg or less, most preferably about 8 Kg or less. The hitch device may be sufficiently small, light, or both so that one user can connect the hitch device to a vehicle. The volume of the device may be about 1 $m^3$ or less, about 75 $m^3$ or less, about 0.5 $m^3$ or less, or even about 0.25 $m^3$ or less. The hitch may have a largest dimension that is about 1 m or less, preferably about 0.5 m or less, or even more preferably about 0.25 m or less. The hitch device may be permanently connected to a vehicle. The hitch device may be connected to a vehicle in under a minute. The hitch device may connect to a standard hitch assembly. Preferably, the hitch device may be removably connected to a vehicle by one or more hitch bars.

The one or more hitch bars may function to extend into a connection feature of a vehicle. The one or more hitch bars may extend from the hitch device to a location under the vehicle. The hitch bars may extend directly out from the vehicle. The hitch bars may drop a distance of about 2 mm or more 6 mm or more, 10 mm or more, or even about 15 mm or more from the connection point with a vehicle. The hitch bar may be a fixed hitch bar (i.e., the drop from the vehicle is static). The hitch bar may be an adjustable hitch bar (i.e., the hitch bar and the hitch mount may be movable relative to each other so that the hitch bar may be dropped and/or raised a distance as is discussed herein. For example, the hitch bar may be used to drop a platform ail of the way to the ground so that a wheel chair may be wheeled directly onto the platform without having to lift the wheel chair and then the platform may be lifted up with the wheel chair for transportation. The hitch bar may be varied using the lifting cylinder of the hitch device. The hitch bar and hitch mount may be adjusted relative to each other by removing a fastener and then placing the fastener back when a predetermined height is achieved. The one or more hitch bars may connect to a hitch of a vehicle by one or more fasteners. The size of the hitch bars may be any size so that the hitch bars may be connected to a receiver of a vehicle. The hitch bars may be any standard size. The hitch bars may work with a 1¼×1¼ inch hitch a 2×2 receiver or a larger receiver. The one or more hitch bars may be sufficiently long so that the one or more hitch bars connect to a feature under the vehicle and extend out from underneath the vehicle so that a trailer can connect to the hitch device. The one or mare hitch bars may be solid, hollow, include one or more open spaces, one or more recesses, one or more connection points, one or more locking points, one or more through holes, or a combination thereof. Preferably, the one or more hitch bars are a square channel. More preferably, the one or more hitch bars connect to a hitch mount and extend cantilever from the hitch mount.

The one or more hitch mounts may function to connect to a vehicle and a trailer. The one or more hitch mounts may be static relative to the hitch bars, the vehicle, or both. The one or more hitch mounts may be fixedly connected to the hitch bar. The one or more hitch mounts may be substantially 90 degrees with the hitch bar. The one or more hitch mounts may be sufficiently strong to that the one or more hitch mounts may assist in moving a device with a weight of about 1,250 Kg or more, about 2,000 Kg or more, about 3,000 Kg or more, about 4,000 Kg or more, or even about 5,000 Kg or more. The one or more hitch mounts may function as a connection feature between two or more other devices that assist in creating a connection point for a trailer. The one or more hitch mounts may include a recess, an access port, a through hole, or a combination thereof of that receives one or more other features of the hitch device. The hitch mount may receive a ball, a ball mount or both. The one or more hitch mounts may include one or more movable portions. The one or more hitch mounts may include one or more apertures or a plurality of apertures for locking a movable portion in place, receiving grease fittings, receiving gears, proving an access port, or a combination thereof.

The one or more apertures may function to restrain movement of one or more portions of the hitch device. Preferably, the aperture functions to restrain movement of a ball mount relative to the hitch mount, to guide the driver rod, or both. One or more of the apertures may be a drive rod slot as is discussed herein. The one or more apertures may be a through hole that extends through one or more sides of a hitch mount (e.g., two parallel sides). The one or more apertures may receive one or more fasteners to restrain one or more movable parts of the hitch device (e.g., a hitch mount). The one or more apertures may include a device extending therefrom that restrains one or more movable parts. For example, the aperture may include one or more spring loaded members that extend therefrom and are axially movable along their axis to create a connection, prevent longitudinal movement of a ball mount, prevent longitudinal movement of a ball, or a combination thereof. The one or more apertures may be threaded, smooth, or both. The one or more apertures may receive one or more grease fittings for introducing grease into the hitch mount, between the hitch mount and the ball mount, or both. The one or more grease fittings may function to provide grease to any location of the hitch device that needs lubrication. The one or more grease fittings, apertures for grease fittings, or both may be located proximate to one or more gear apertures.

The one or more gear apertures may function to provide access into the hitch mount. The one or more gear apertures may function to allow the hitch mount to be moved by a device that is at least partially located outside of the hitch mount. The one or more gear apertures may function to allow a gear to extend into the hitch mount and into communication with a ball mount. For example, the gear may be in communication with a motor and as the motor rotates the gear the gear moves the ball mount (e.g., a rack and pinion configuration). The one or more gear apertures may allow one or more gears, one or more screws, one or more toothed devices, one or more threaded devices, or a combination thereof to extend into a hitch mount into contact with a ball mount.

The ball mount may function to connect a ball to the hitch device. The ball mount may move a ball so that a trailer may be aligned with the hitch device, the trailer may be leveled, the trailer may be dumped, or a combination thereof. The ball mount may be movable along a longitudinal axis that extend though the ball mount. The ball mount may include a rack, teeth, or both that may facilitate movement of the ball mount within the hitch mount. The ball mount may be locked in place once the ball mount is moved a desired distance, is at a desired location, or both. For example, the ball mount may include one or more and preferably a plurality of locking devices that lock prevent movement of the ball mount The ball mount may be a discrete piece that extends through the hitch mount, around the hitch mount, or a combination of both. The ball mount may be complementary to the hitch mount or vice versa The ball mount may be sufficiently strong so that the ball mount when forming a substantially cantilever connection with the hitch mount may be used to tow a trailer with a weight discussed herein. The ball mount may include a connection point for one or more balls. Preferably, the ball mount includes at least a connection point for a ball at a top of the ball mount.

The ball may function to receive and/or be inserted into a portion of a trailer so that a connection is created between a vehicle and the trailer. The ball may function to create a pivotable connection between a trailer and a vehicle. The ball may function to create a locking point for a trailer to connect to a vehicle so that the vehicle moves the trailer. Preferably, the ball extends into a tongue of a trailer so that he trailer is connected to a vehicle for moving the trailer and associated items in and/or on the trailer. The ball may be any size so that the ball may form a connection. The ball may be any sized ball (e.g., 1⅞ in, 2 in, 2⅝ in, 50 mm, class I, class II, class III, class IV, or a combination thereof). The ball and ball mount may be movable unless the ball and ball mount are locked via one or more locking devices located on the ball mount.

The one or more locking devices may function to prevent movement of the ball, ball mount, or both along a longitudinal axis of the ball mount, hitch mount, or both. The one or more locking devices may be alignable with one or more of the one or more apertures. The one or more locking devices may function to receive one or more devices that prevent movement of the ball mount, the ball, or both. The one or more locking devices may be a through hole, a spring loaded device, a laterally movable device, a locking member, a device that locks the drive rod in place, or a combination thereof. The one or more locking devices may prevent a lifting device from moving the ball, the ball mount, or both. The one or more locking devices may remove pressure from the lifting device so that the lifting device can stop supporting the ball, ball mount, or both.

The lifting device may function to lift a ball, a ball mount, a trailer, a tongue of a trailer, a utility basket (e.g., a wheel chair carrier, a tote for supplies, a bike rack, the like, or a combination thereof), or a combination thereof. The lifting device may lift vertically, at an angle, or both. Preferably, the lifting device vertically lifts the ball, the ball mount, or both. The lifting device may create an electric lifting force, a hydraulic lifting force, a mechanical lifting force, a pneumatic lifting force, a geared lifting force, or a combination thereof. The lifting device may generate a sufficient lifting force to lift about lift about 500 Kg or more, about 800 Kg or more, or preferably about 1000 Kg or more. The lifting device may include one or more lifting cylinders, one or more controllers, or both.

The one or more controllers may function to actuate the lifting device, the one or more cylinders, a motor, a pump, or a combination thereof. The one or more controllers may be located on any part of the hitch device so that been a trailer is connected to the hitch device the hitch device may be actuated, the one or more controllers may be exposed, or both. The one or more controllers may be located on the lifting cylinder, the platform, the hitch mount, or a combination thereof. The one or more controllers may be wireless, may include a wire, may be hardwired into a part of the hitch device, or a combination thereof. The one or more controllers may connect to a vehicle so that a user may actuate the hitch device from within the vehicle, at a remote location, or both. The one or more controllers may include a camera, a proximity sensor, a monitoring device, or a combination thereof so that the user may view the status of the hitch device, the connection with the hitch device, the levelness of the trailer, or a combination thereof from within the vehicle, from a remote location, or both. The one or more controllers may be connected to the vehicle's back up camera. The one or more controllers may connect to a cell phone. The one or more controllers may project an image to a cell phone so that the cell phone may be used to view movement of the hitch device, control movement of the hitch device, or both. The one more controllers may produce a Bluetooth® signal, a wireless signal, a wifi signal, or a combination thereof so that an image is projected from the hitch device to a camera, a control is provided to the hitch device, or both. A portion of the one or more controllers may be a key fob that is in wireless communication with a controller in the lifting device, the hitch device, or both. A portion of the controller may be in the hitch device and a portion of the controller may be remotely located. The one or more controllers may automatically adjust when a unbalanced condition is sensed. The device may include a level bubble so that a user may check the levelness of a trailer, the hitch device, or both. The one or more controllers may connect to one or more sensors located in and/or on the trailer. The one or more controllers may wirelessly communicate with one or more sensors and/or cameras placed on the trailer. The one or more controllers may control one or more lifting cylinders so that the lifting cylinders move the trailer, level the trailer, or both.

The one or more lifting cylinders may function to move one or more drive rods, one or more balls, one or more ball mounts, or a combination thereof. The one or more lifting cylinders may generate force mechanically, hydraulically, electrically, pneumatically, or a combination thereof to create the lifting force. The one or more lifting cylinders may generate pressure that displaces one or more drive rods. The one or more lifting cylinders may rotate one or more drive rods so that the one or more drive rods axially extend along their own axis. The one or more lifting cylinders may include a pulley, a belt, gears, cogs, fluid, screws, or a combination thereof. The one or more lifting cylinders may displace a fluid that creates a lifting force. The one or more lifting cylinders may include a pump, a motor, or both. The one or more lifting cylinders may include one or more seals for producing a fluid force, for sealing a platform, or both. The one or more lifting cylinders may include a fluid reserve, a fluid bladder, a compressible chamber, or a combination thereof. The one or more lifting cylinders may be connected to a platform, may extend into a platform, may work in conjunction with a platform, or a combination thereof.

The one or more platforms may function to connect a lifting cylinder to a hitch mount, to transfer power between a lifting cylinder and a drive rod, to store excess fluid, or a combination thereof. The one or more platforms may be sufficiently large to connect the hitch mount and the lifting cylinder so that they are located side by side, are substantially parallel, are located adjacent, located juxtaposed, or a combination thereof. The one or more platforms may receive all or a portion of a motor, a lifting cylinder, or both. The one or more platforms may extend laterally, longitudinally, horizontally, vertically, or a combination thereof. The platform may be sufficiently strong so that the platform resists movement during lifting of a trailer, movement of the ball, movement of the ball mount, or a combination thereof. The platform may be sufficiently strong so that the platform counteracts the reactionary force generated as the drive rod moves the ball mount, ball, trailer, tongue, or a combination thereof. The platform may house one or more gears, one or more fluid reserves, one or more mechanisms that move a drive rod along its axis, or a combination thereof. The platform may rest on the ground so that the hitch device may be used as a jack. The hitch device may be free of a platform. The platform may house gears so that the gears are protected from the environment (e.g., rain, wind, snow, dirt, fluids, etc. . . . ). The platform may be one or more gear boxes, include one or more gear boxes, or both.

The one or more gear boxes may function to drive one or more one or more drive rods, one or more shafts or both directly and/or indirectly. The one or more gear boxes may be a gear reduction, a gear multiplier, or a combination of both. For example, the motor may rotate a shaft connecting the motor to the gear box at a first speed and the gear box may increase a speed of a shaft extending out of the gear box so that the ball mount is moved at a faster rate than that of the motor speed. The gear box may increase torque from the motor so that a device with a weight as discussed herein may be lifted with a small motor. The gear box may step up torque to move the ball mount. The gear box may include one or more shafts that extend therefrom. The gear box may directly drive one or more drive rods. Preferably, the gear box drives a shaft and the shaft applies power to a drive rod that ultimately moves the ball mount. The gear box may be switched between a lifting cylinder providing power and manual power. The gear box may be switch between a driven configuration, a manual configuration, a neutral configuration, a free wheel configuration, or a combination thereof. The gear box may be manually driven, driven by a lifting cylinder as taught herein, driven by an auxiliary device, or a combination thereof.

One or more hand cranks may be in communication with the gear box, the drive rod, or both so that the ball mount, the ball, or both may be manually operated. The one or more hand cranks, auxiliary devices, or both may function to provide a user with the ability to move the ball, ball mount, or both upon failure of a lifting cylinder, motor, or both. The hand crank may be connected to the hitch device. The hand crank may be an integral part of the hitch device. The hand crank may be removable from the hitch device. The hand crank may move one or more gears to actuate the ball, ball mount, or both. An auxiliary device may be used to move the ball, the ball mount, or both. The auxiliary device may connect to a fastener, be inserted into a slot, or both. The auxiliary device may be a drill, a battery powered device, a gas powered device, a wrench, a screw driver, a ratchet, or a combination thereof that may move a gear so that the ball, ball mount, or both are moved. The auxiliary device directly provide power to the gear box, a shaft, a drive rod, or a combination thereof.

The one or more shafts may function to move the ball mount directly and/or indirectly. The one or more shafts may function to rotate a gear so that the ball mount is moved. The one or more shafts may function to transfer power from the motor to a location of interest. The one or more shafts may function to transfer power to a ball mount. The one or more shafts may function to drive one or more gears. The one or more shafts may extend from a motor into contact with a drive rod so that the drive rod moved and facilitates movement the ball and/or ball mount.

The drive rod may function to move along an axis, to lift a tongue, lift a trailer, lift a utility basket, lift a ball, lift a ball mount, or a combination thereof. The drive rod may be substantially linear, may include one or more arcuate segments, may include threads, may be free of a threaded portion, or a combination thereof. The drive rod may be substantially the same size and shape along its entire length. The drive rod may include a bulbous portion at its bottom, a flared out portion at its bottom, a portion with an increased surface area, or a combination thereof. For example, the drive rod may be an upside down "T." The drive rod may include a portion that assists in moving the drive rod with a fluid. The drive rod may be in direct communication with a motor, a lifting cylinder, or both. The drive rod may be in indirect communication with a motor, a lifting cylinder, or both. The drive rod may be moved along its axis without rotating. Preferably, at least a portion of the drive rod is rotated as the drive rod moves along its axis. The drive rod may include a portion that axially moves the drive rod, creates a lifting force, or a combination thereof. The drive rod may be of a sufficient size to lift about 500 Kg or more, about 800 Kg or more, or preferably about 1000 Kg or more. The one or more drive rods, one or more shafts, or both may include gears, be connected to gears, or both.

The one or more gears may function to transfer power from a lifting cylinder, a motor, or both to a ball, a ball mount, or both. The one or more gears may function to facilitate movement of the ball, ball mount, or both. The one or more gears may provide power from a motor to a drive rod that is located at an angle relative to the motor. The one or more gears may rotate the drive rod, the shaft, or both so that movement is created. The one or more gears may be a worm gear, a miter gear, a spur gear, beveled gear, spiral beveled gear, a helical gear, a spiral gear, a rack and pinion, hypoid gear, or a combination thereof. The one or more gears may be located at ends of a shaft, ends of a drive rod, on the ball mount, in end regions of the shaft and/or drive rod, or a combination thereof. Preferably, a shaft extends from a motor and the shaft includes a gear that is in communication with a gear on the drive rod so that the shaft axially moves a portion of the drive rod. In another preferred example, a shaft extends from a motor and the shaft includes a gear and the gear is in direct communication with a gear on the ball mount so that the ball mount is directly driven (e.g., a rack and pinion configuration). The gears may include one or more and preferably a plurality of teeth. The teeth may intermesh with teeth on another gear, teeth on a ball mount, or both. The teeth may provide rotational movement, axial movement, or both. The teeth may function to provide power from one location to a second location. The one or more drive rods may have a portion that is located on each side of a drive rod slot so that an axis of the drive rod is maintained during movement.

The one or more drive rod slots may function to axially align the drive rods, maintain a seal around the drive rods, or both. The one or more drive rod slots may place the one or more drive rods in communication with a fluid so that the fluid axially moves the drive rod, with a geared mechanism, a belt, or a combination thereof. The one or more drive rod slots may be a through hole in the platform, may allow the drive rod to be in communication with the lifting cylinder, or a combination thereof. The one or more drive slots may assist in axially moving a drive rod. The one or more drive rods may be fixedly connected, removably connected, or both to the ball mount. The one or more drive slots may extend into a hitch mount, be surrounded by a hitch mount, or both so that the hitch mount may be connected to the platform via one or more fasteners.

The one or more fasteners may function to connect one or more devices together, may function to prevent movement of one or more devices, may assists in holding one or more devices static so that one or more devices may be moved, or a combination thereof. The one or more fasteners may connect a lifting cylinder, a hitch mount, or both to a platform. The one more fasteners may lock the hitch mount in a static position and allow the ball mount to axially move. The one or more fasteners may extend through one or more through holes to prevent movement of one or more devices. For example, one or more fasteners may extend through an aperture of a hitch mount and a locking device of a ball mount so that the ball mount and hitch mount are locked together in an axially static relationship. The one or more fasteners may connection a connection device to a hitch bar, a hitch mount, a platform, or a combination thereof.

The one or more connection devices may attach a lifting cylinder, a motor, or both to the hitch device. The one or more connection devices may receive all or a portion of lifting cylinder, motor, or both and fixedly form a connection with the hitch device. The connection device may form a seal around the motor, lifting cylinder, or both so that they are shielded from the elements (e.g., rain or snow). The connection device may include a through hole for one or more shafts to extend through. The connection device may extend in any configuration so that power is provided from the motor to the ball mount to facilitate movement of the ball mount. The connection device may be made of one or mare pieces, two or more pieces, or even three or more pieces. The connection device may include portions that are anti-vibration. The connection device may include elastomeric portions. The connection device may dampen vibrations to the motor, lifting cylinder, or both as the hitch device moves with a vehicle, as the hitch device operates, or both.

The motor may function to provide power to the ball, the ball mount, or both to facilitate movement of the ball, ball mount, or both. The motor may directly drive the ball mount (e.g., teeth on a gear extending from the motor may directly contact teeth on a ball mount so that the ball mount is moved by the gear (i.e., a rack and pinion configuration)). Preferably, the motor functions to be connected to a vehicle and powered by 12 v, 24 v, or 48 v power. The motor may connect to the trailer to obtain power. The motor may connect to the vehicle to obtain power. The motor may include batteries or connect to a battery for power. The motor may be an electric that drives a shaft. The motor may include an electric pump that moves hydraulic fluid so that a shaft is moved.

FIG. 1 illustrates a perspective view of a hitch device 2. The hitch device 2 includes a hitch bar 4 for connecting the hitch device 2 to a hitch of a vehicle (not shown). The hitch bar 4 is connected to a hitch mount 6 that receives a ball mount 14 and ball 12. The ball mount 14 and ball 12 are located adjacent to a lifting device 20. The lifting device 20 includes a platform 24 that is connected to the hitch mount 6 and the lifting cylinder 22. The lifting device 20 moves that ball 12 and ball mount 14 inside of the hitch mount 6.

Figure 2:
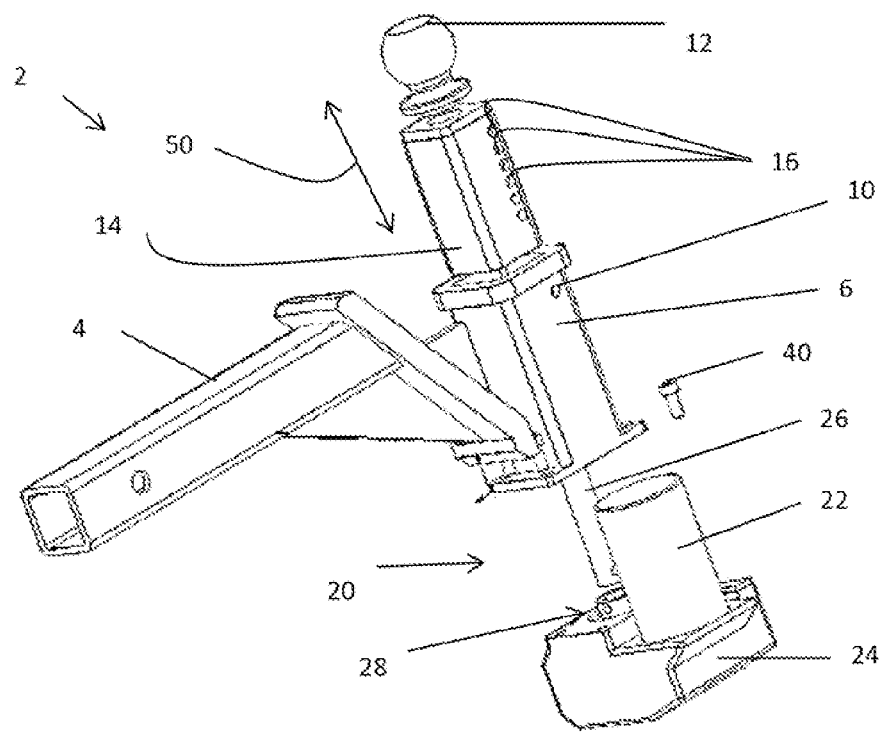
FIG. 2 illustrates an exploded view of the hitch device of FIG. 1.

FIG. 2 illustrates an exploded view of a hitch device 2. The hitch device 2 includes a hitch bar 4 that is connected to a hitch mount 6. The hitch mount 6 includes and an aperture 10 and a space for receiving a ball mount 14. The ball mount 14 includes a plurality of locking devices 16 so that as the height of the ball mount 14 is varied, the ball mount 14 and hitch mount 6 may be connected to each other via a fastener (not shown) extending through the aperture 10 and one of the locking devices 16. The ball mount 14 has a ball 12 adjacent to the top so that a tongue (not shown) of a trailer can be connected to a vehicle containing the hitch device 2. The ball 12 and ball mount 14 are movable in the directions 50 via a drive rod 26 of the lifting device 20. The drive rod 26 extends into a platform 24 of the lifting device 20 through a drive rod slot 28. The drive rod slot 28 is located adjacent a lifting cylinder 22 so that during movement of the drive rod 26 the lifting cylinder 22 generates a force to move the drive 26 upward in the direction 50 to raise the ball 12, and releases a force to move the drive rod 26 downward in the direction 50 to lower the ball 12. The drive slot 28 extends out of a portion of the platform 24 and the hitch mount 6 is connected to the platform 24 by fasteners 40.

Figure 3:
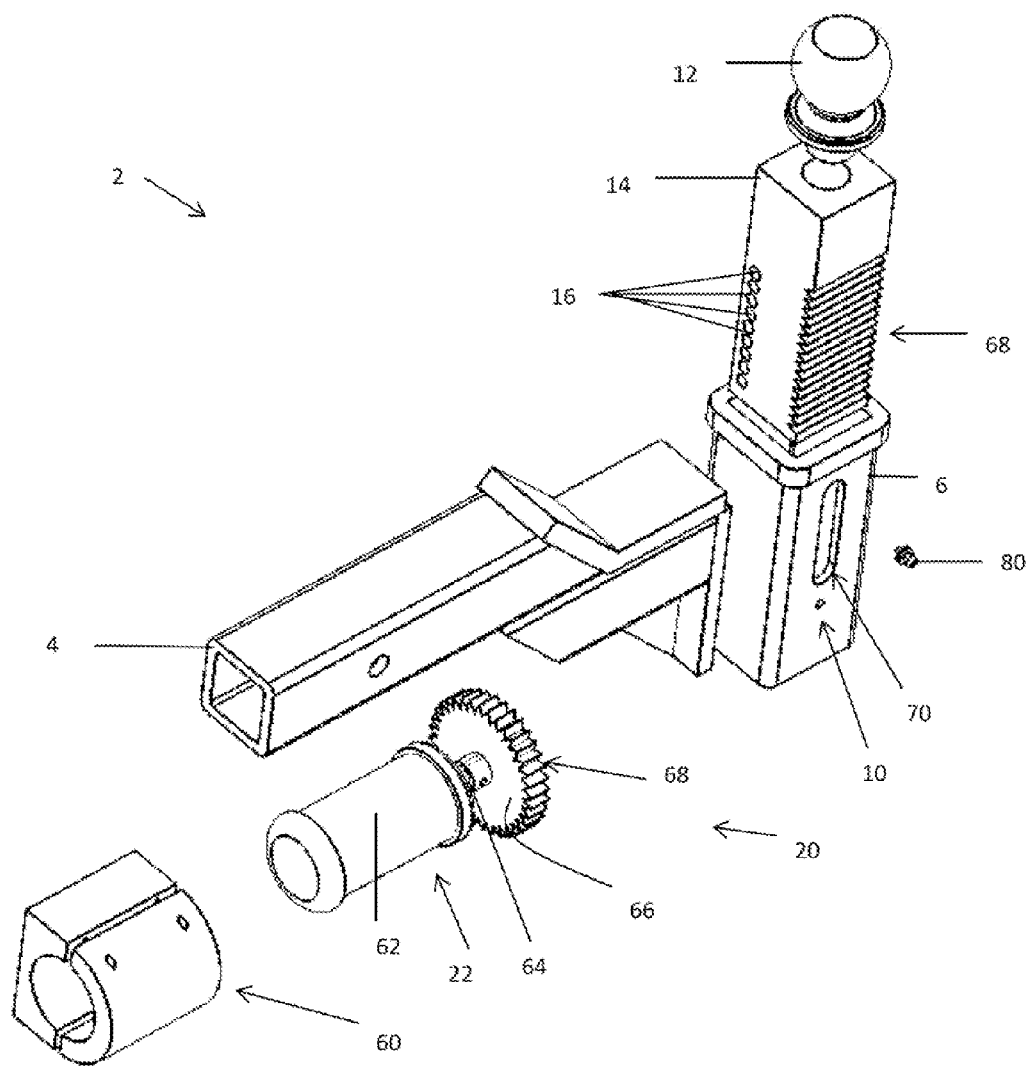
FIG. 3 illustrates an exploded view of a hitch device.

FIG. 3 illustrates a perspective view of a hitch device 2. The hitch device 2 includes a hitch bar 4 inducing a hitch mount 6. The hitch mount 6 includes an aperture 10 and a gear aperture 70 and receives a ball mount 14 that is connected to a ball 12. The ball mount 14 is movable within the hitch mount 6 via a plurality of teeth 68 that are in communication with teeth 68 on a gear 66 that extends through the gear aperture 70. The gear 66 is connected to a shaft 64, which is connected to a motor 62 so that the motor rotates the gear 66 to actuate the ball mount 14. The motor 62, shaft 64, gear 66, platform 24 and connection device 60 are all part of the lifting device 20 that includes a lifting cylinder 22 that moves the ball 12 so that a connection can be formed with a trailer (not shown). The platform 24 as illustrated is a connection device 60 that houses a portion of the motor 62 and connects the motor 62 to the hitch bar 4. The ball mount 14 includes a plurality of locking devices 16 that receive a fastener so that the ball mount 14 and the hitch mount 6 can be connected together to prevent movement of the hitch mount 6. A grease fitting 80 is connected to the aperture 10 proximate to the gear aperture so that grease can be introduced into the hitch mount to facilitate movement of ball mount 14 relative to the hitch mount 6 and to provide lubrication between the teeth 68 of the gear 66 and the teeth 68 of the ball mount 14.

Figure 4:
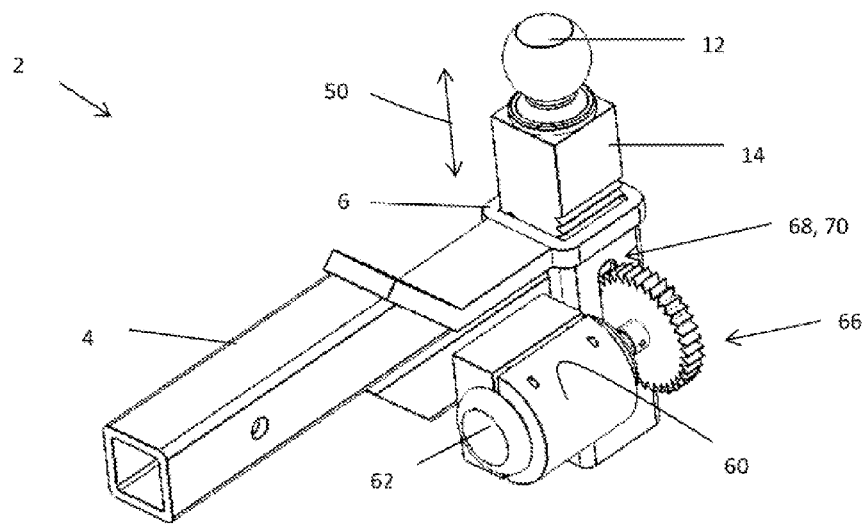
FIG. 4 illustrates a top perspective view of the hitch device.

FIG. 4 illustrates a perspective view of the hitch device 2. The ball 12 and ball mount 14 are movable in the direction 50 by the teeth 68 of the gear 66 extending thought the gear aperture 70 and contacting the teeth 68 of the ball mount 14 and moving the ball mount 14 within the hitch mount 6. The gear 66 is driven by a motor 62 that is connected to the hitch bar 4 by a connection device 60.

Figure 5:
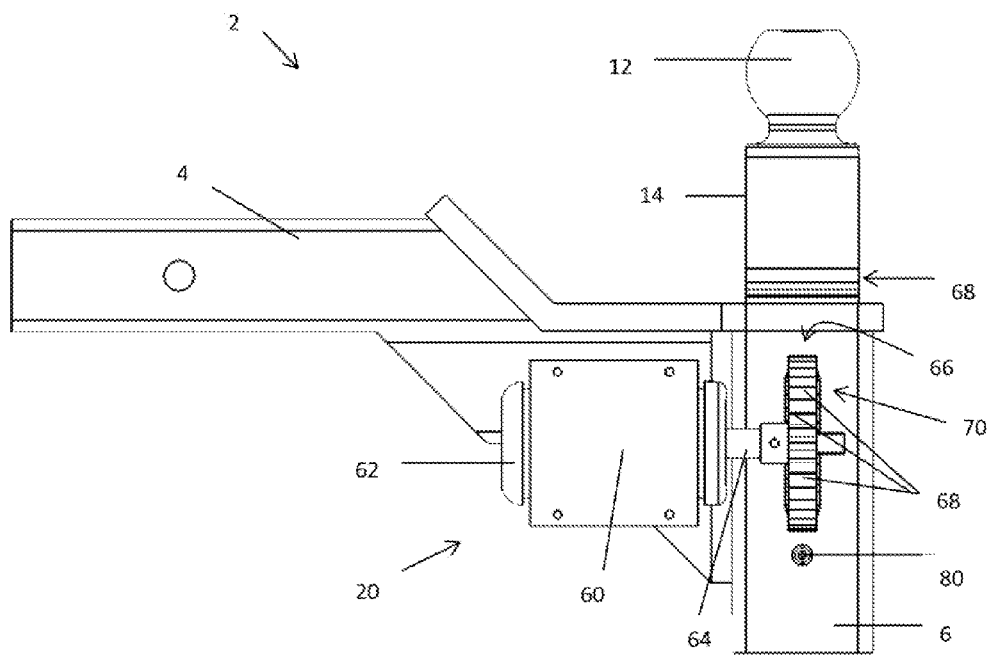
FIG. 5 illustrates a side view, of the hitch device of FIG. 4.

FIG. 5 illustrates a side view of the hitch device 2. The hitch device 2 includes a hitch bar 4 and hitch mount 6 with a lifting device 20 connected to the hitch bar 4. The hitch mount 6 includes a grease fitting 80 and a gear aperture 70 located proximate to each other. The ball mount 14 and ball 12 are movable by teeth 68 of a gear 66 extending through the gear aperture 70 into contact with teeth 68 on the ball mount 14. The lifting device 20 is connected to the hitch bar 4 by a connection device 60 that houses the motor 62. A shaft 64 extends between the motor 62 and a gear 66 and the gear 66 extends through a gear aperture 70 so that the teeth 68 of the gear 66 and the teeth 68 of the ball mount 14 are in contact.

Figure 6:
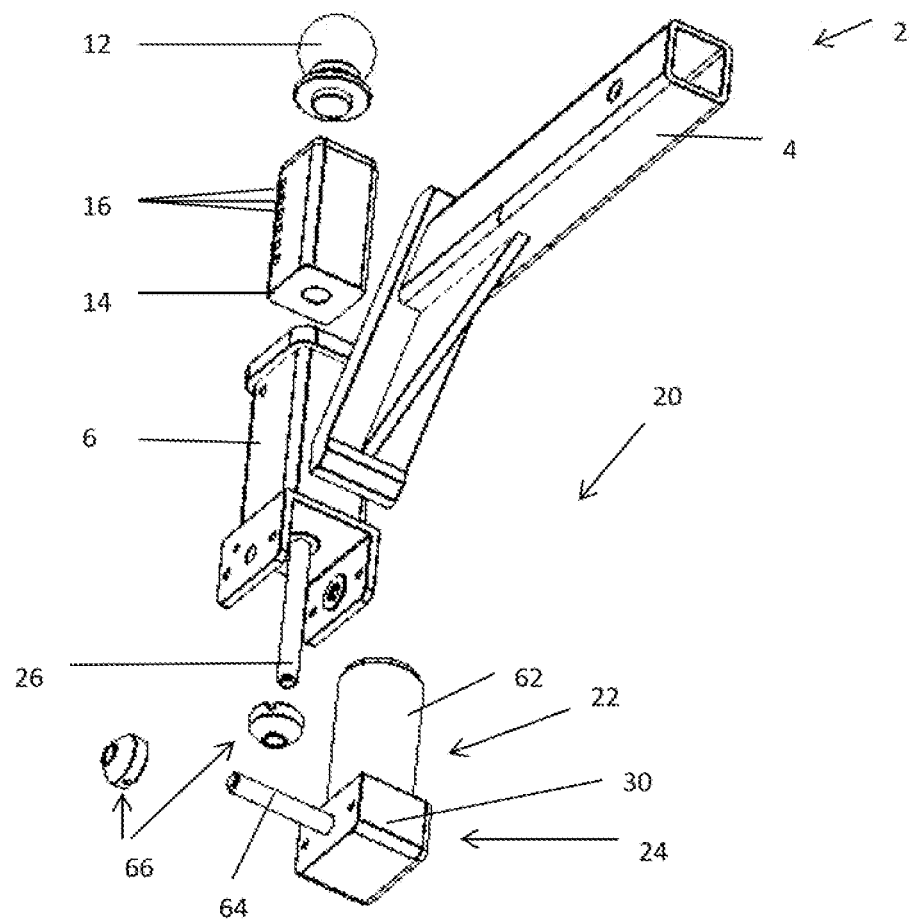
FIG. 6 illustrates a bottom exploded view of a hitch device.

FIG. 6 illustrates a bottom exploded view of the hitch device 2. The hitch device 2 includes a hitch bar 4 that is integrally connected to a hitch mount 6. The hitch mount 6 receives a ball mount 14 that includes a ball 12 on its top and a plurality of locking devices (through holes as illustrated) extending through the ball mount 14 so that the ball mount 14 and hitch mount 6 can be connected together to prevent movement of the ball mount 14 relative to the hitch mount 6. A bottom of the hitch mount 6 includes a lifting device 20. The lifting device includes a platform 24, which includes a gear box 30 that is located under a lifting cylinder 22, which as shown is a motor 62. The gear box 30 is in communication with a shaft 64 that includes a gear 66. The gear 66 of the shaft is in communication with a gear 66 connected to a drive rod 26 that extends into the hitch mount and moves the ball mount up and down.

Figure 7:
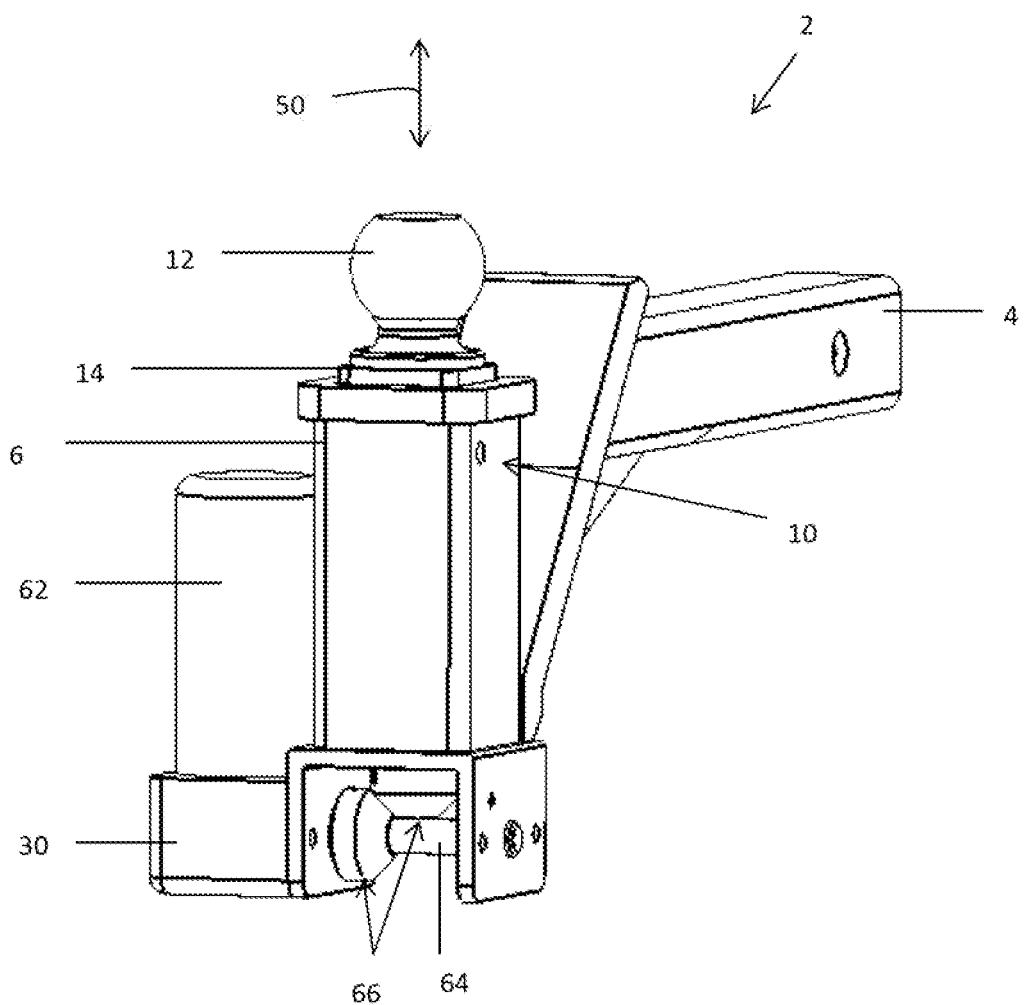
FIG. 7 illustrates a rear perspective view of the hitch device of FIG. 6.

FIG. 7 is a rear perspective view of the hitch device 2 showing the gears 66 attached to the shaft 64 in communication with the gear 66 connected to the drive rod (not shown) that extends into the hitch mount 6. During movement of the drive rod (not shown) the motor 62 turns gears in the gear box 30. The gear box 30 is connected to a shaft 64 extending therefrom, which includes a gear 66. The gear 66 of the shaft 64 is in communication with a gear 66 of the drive rod (not shown) and as the gears 66 are rotated the drive rod is moved up or down resulting in the ball mount 14 and ball 12 moving up or down in the direction 50. The hitch mount 6 includes an aperture 10 for receiving a fastener (not shown) that extends through the aperture 10 and into the locking device 16 so that the hitch mount 6 and the ball mount are fixed to each other and movement is prevented. The hitch mount 14 moves up and down in the direction 50 when the hitch bar 4 is connected to a vehicle (not shown) so that the ball 12 may be placed in or released from a tongue of a trailer (not shown) or a trailer is leveled.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:

1. A hitch device comprising:
   a. a hitch bar that connects the hitch device to a vehicle;
   b. a hitch mount in communication with the hitch bar;
   c. a ball mount, a ball, or both that is in communication with and extends through a portion of the hitch mount;
   d. a lifting device that is connected to the hitch mount, the hitch bar, or both, wherein the lifting device includes a lifting cylinder; and
   e. one or more gears in communication with the lifting cylinder;
   wherein the lifting device assists in moving the ball mount, the ball, or both through the hitch mount;
   wherein the lifting cylinder includes an electric motor;
   wherein the one or more gears in communication with the lifting cylinder are in direct communication with the ball mount so that the one or more gears directly move the ball mount; and
   wherein the one or more gears in communication with the lifting cylinder extend through a gear aperture in the hitch mount and into contact with the ball mount.

2. The hitch device of claim 1, wherein the ball, the ball mount, or both are directly connected to a drive rod and the drive rod moves the ball, the ball mount, or both within the hitch mount.

3. The hitch device of claim 2, wherein the drive rod includes a gear on an end that is in communication with the one or more gears in communication with the lifting cylinder.

4. The hitch device of claim 1, wherein the hitch mount and the lifting device are connected via a platform.

5. The hitch device of claim 1, wherein the ball is connected to the ball mount so that movement of the ball mount moves the ball, and the ball mount includes a plurality of locking devices so that when the ball mount is moved to a specified position the ball mount is connected to the hitch mount and a position of the ball is fixed.

6. The hitch device of claim 5, wherein the hitch mount includes one or more apertures so that when the one or more of the plurality of locking devices is aligned with one or more of the one or more apertures a fastener is extended through the one or more plurality of locking devices and the one or more apertures to lock the position of the ball mount relative to the hitch mount.

7. The hitch device of claim 1, wherein the lifting device includes a platform that connects the lifting cylinder to the hitch mount, and the platform includes one or more drive rod slots that receive all or a portion of a drive rod so that the drive rod can move up and down and move the ball mount up and down.

8. The hitch device of claim 1, wherein the lifting device includes a gear box, and the lifting cylinder is connected to the electric motor, which provides power to the gear box and the gear box rotates the one or more gears in communication with the lifting cylinder.

9. The hitch device of claim 8, wherein the one or more gears in communication with the lifting cylinder are movably connected to a gear at an end of the drive rod so that the one or more gears in communication with the lifting cylinder transfer power from the lifting cylinder to the gear at the end of the drive rod and actuate the drive rod so that the ball mount is moved.

10. The hitch device of claim 1, wherein the ball mount includes one or more teeth in communication with the gear.

11. The hitch device of claim 1, wherein the lifting cylinder is connected to the hitch bar by a connection device.

12. The hitch device of claim 2, wherein the drive rod is threaded, free of threads, or a portion of both.

13. The hitch device of claim 1, wherein the hitch device weighs about 25 Kg or less.

14. The hitch device of claim 1, wherein the hitch device connects to a trailer light power outlet, a vehicle power, a battery, or combination thereof.

15. A hitch device comprising;
   a. a hitch mount including:
      i. a hitch bar extending from the hitch mount, the hitch bar being configured to connect the hitch device to a vehicle;
      ii. a ball mount at least partially extending into the hitch bar, wherein the ball mount is movable relative to the hitch mount and the hitch bar;
      iii. a ball connected to the ball mount, and being movable with the ball mount;
      iv. a plurality of locking devices longitudinally located along the ball mount; and
      v. one or more apertures located in the hitch mount so that the ball mount upon movement to a desired location can be locked relative to the hitch mount by extending one or more fasteners through one or more of the plurality of locking devices and one or more of the one or more apertures; and
   b. a lifting device including:
      i. a lifting cylinder;
      ii. one or more gears in communication with the lifting cylinder that assist in moving the ball mount, the ball, or both within the hitch mount, the one or more gears being in direct communication with the ball mount through a gear aperture in the hitch mount;
      iii. a platform connecting the lifting cylinder to the hitch mount;
      iv. a shaft extending from the platform;
      v. one or more gears connected to an end of the shaft opposite the platform;
      vi. a drive rod including one or more gears that are in communication with the one or more gears connected to the shaft so that power from the lifting cylinder is transferred from the shaft to the drive rod so that the ball mount is moved along its axis; and
   wherein the drive rod is longitudinally extendable by the lifting cylinder so that the drive rod moves the ball mount along the axis raising or lowering the ball so that when a trailer is connected to the ball a tongue of the trailer can be raised and lowered so that the trailer can be dumped, leveled, or both; and
   wherein the lifting cylinder includes an electric motor.

16. The hitch device of claim 15, wherein the hitch device includes a connection device that houses a portion of the electric motor and connects the electric motor to the hitch bar.

17. The hitch device of claim 16, wherein the ball mount includes a plurality of teeth that are in communication with the one or more gears.

18. The hitch device of claim 17, wherein the hitch mount includes an aperture and with a grease fitting, the aperture being located proximate to the gear aperture.

19. The hitch device comprising:
   a. a hitch bar that connects the hitch device to a vehicle;
   b. a hitch mount in communication with the hitch bar and having a bracket attachable at a bottom side;
   c. a ball mount, a ball, or both that is in communication with and extends through a portion of the hitch mount;
   d. a lifting device that is connected to the hitch mount, the hitch bar, or both, wherein the lifting device includes a lifting cylinder; and
   e. one or more gears in communication with the lifting cylinder;
   wherein the lifting device assists in moving the ball mount, the ball, or both through the hitch mount;
   wherein the lifting cylinder includes an electric motor;
   wherein the one or more gears in communication with the lifting cylinder are in direct communication with the ball mount so that the one or more gears directly move the ball mount; and
   wherein the one or more gears in communication with the lifting cylinder are in communication with a shaft that is in communication with the electric motor, the shaft extending through an aperture in the bracket.

20. The hitch device of claim 19, wherein the lifting device, the lifting cylinder, the drive rod, or a combination thereof can lift about 500 Kg or more.

* * * * *